March 10, 1970     J. R. MacDONALD ET AL     3,499,421
CAGE TYPE LOBSTER FARM
Filed March 6, 1968                                                           6 Sheets-Sheet 3
FIG. 3
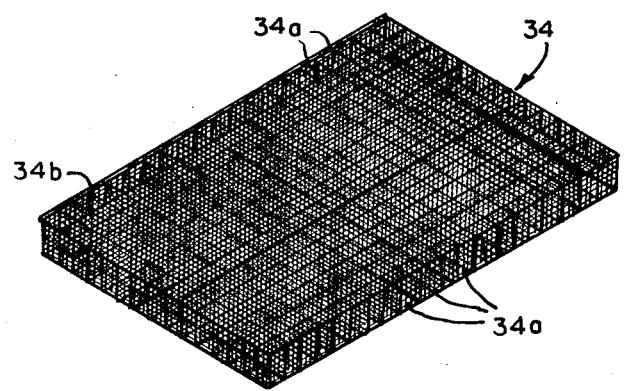
FIG. 4
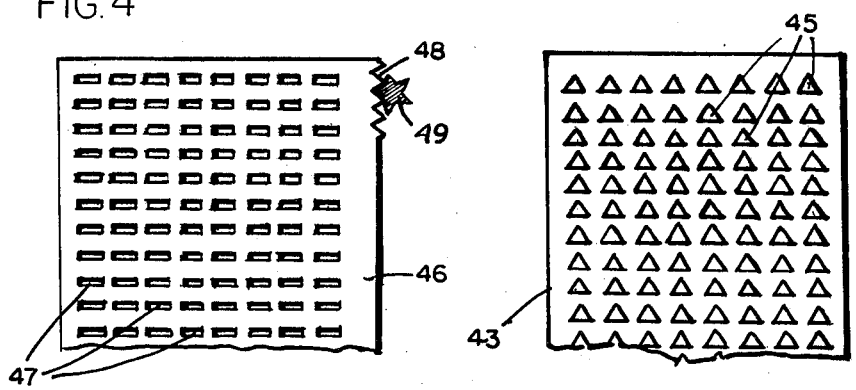
FIG. 5
FIG. 6
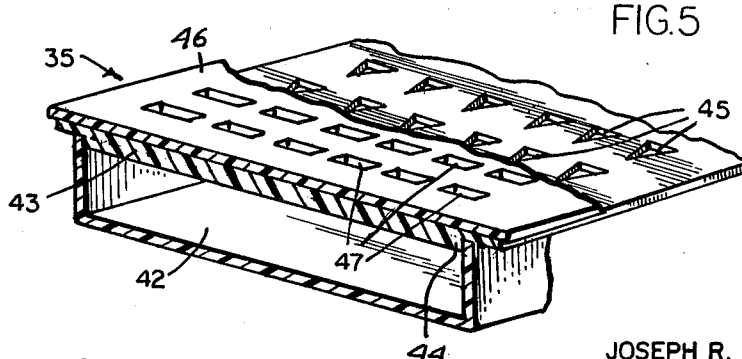
INVENTORS
JOSEPH R. MAC DONALD
WINFRED A. MAC DONALD
BY,
ATTORNEY

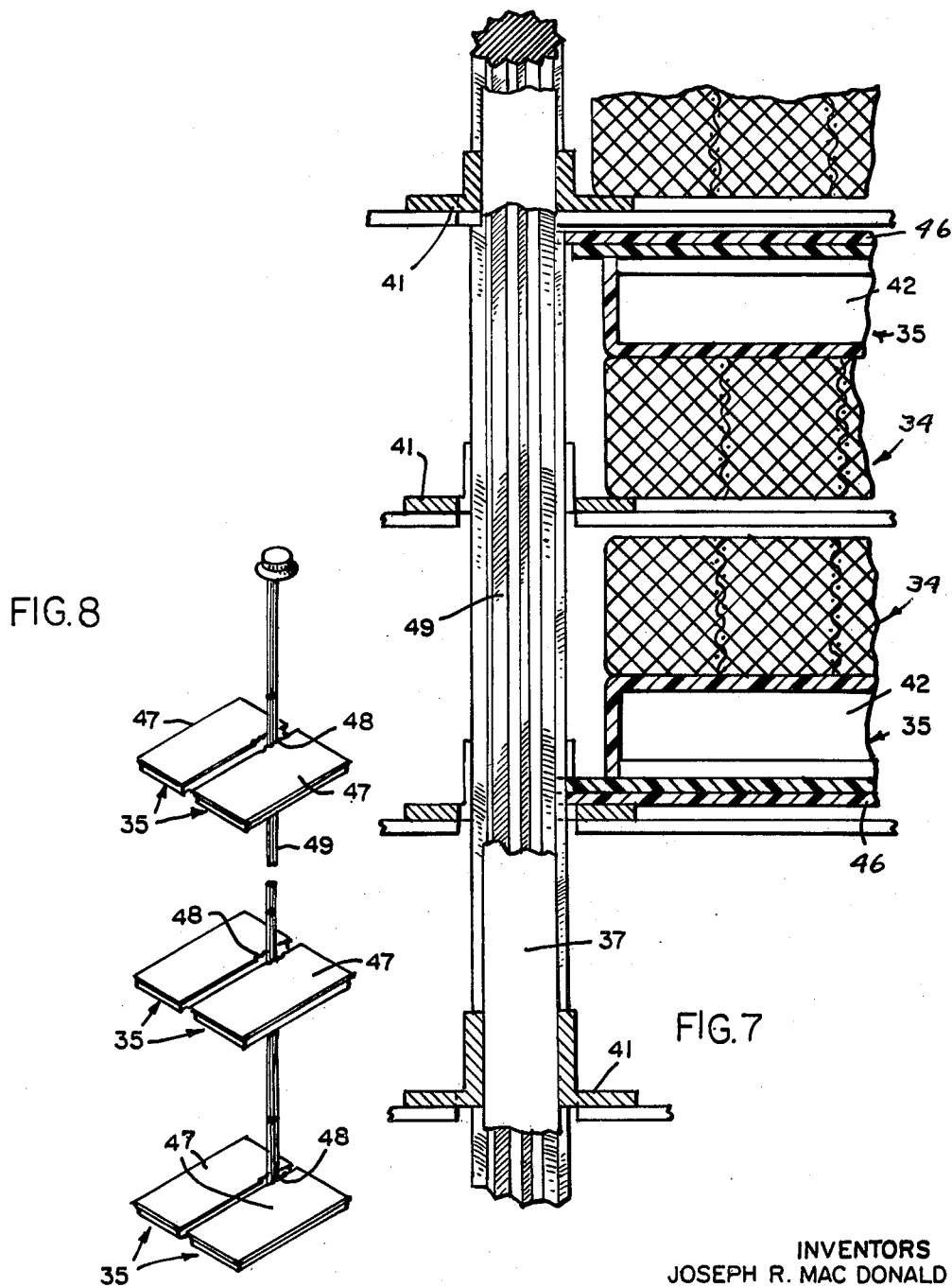

March 10, 1970   J. R. MacDONALD ET AL   3,499,421
CAGE TYPE LOBSTER FARM
Filed March 6, 1968   6 Sheets-Sheet 5

INVENTORS
JOSEPH R. MAC DONALD
WINFRED A. MAC DONALD
BY,
ATTORNEY

March 10, 1970    J. R. MacDONALD ET AL    3,499,421
CAGE TYPE LOBSTER FARM
Filed March 6, 1968    6 Sheets-Sheet 6

INVENTORS
JOSEPH R. MAC DONALD
WINFRED A. MAC DONALD
BY,
ATTORNEY

United States Patent Office 3,499,421
Patented Mar. 10, 1970

3,499,421
CAGE TYPE LOBSTER FARM
Joseph R. MacDonald, 63 Franklin Road, Winchester, Mass. 18190, and Winfred A. MacDonald, 230 Essex St., Melrose, Mass. 02176
Filed Mar. 6, 1968, Ser. No. 710,995
Int. Cl. A01k 61/00, 63/00
U.S. Cl. 119—2
15 Claims

ABSTRACT OF THE DISCLOSURE

Lobster rearing farm including cages movable between submerged and servicing positions together with means to supply feed to the submerged cages and with means for entrapping fish drawn to the station by escaping lobster food, and cages, cells, and food containers for use in rearing lobsters.

---

Figure 1:
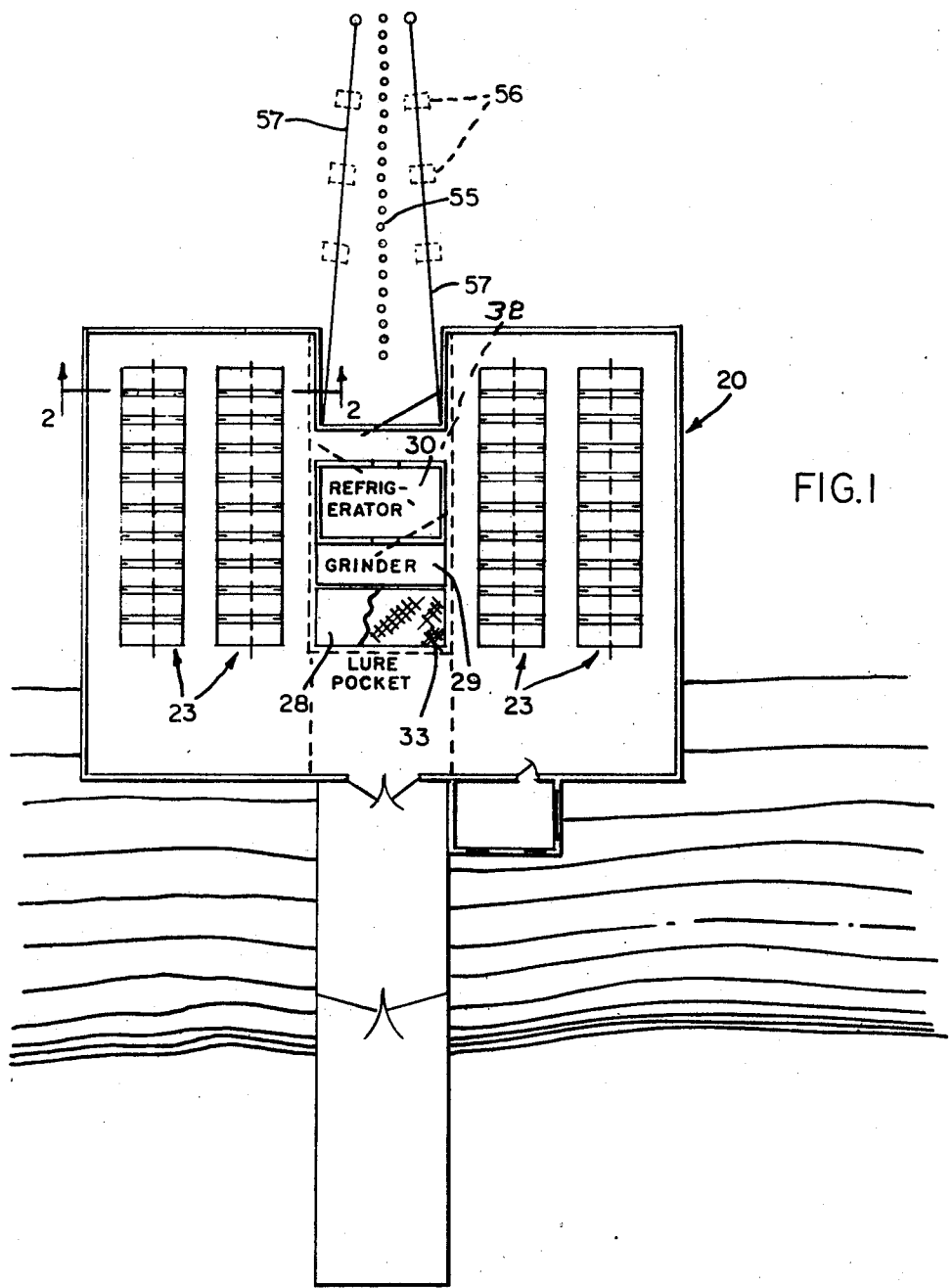

Even with increased fishing efforts, the lobster supply cannot keep pace with the demand. As lobsters are slow-growers it is not likely that the ever increasing demand for them can be met naturally.

The objective of the present invention is to provide a farm to rear lobsters in a natural environment for the market. While farm-raised lobsters offer the advantage of lower mortality rates, faster growth rates, and the elimination of costs presently incurred in catching lobsters, labor and food costs are factors that determine whether or not lobster farming can be successful in meeting marketing requirements and conditions.

In accordance with the invention, this general objective it met by providing a farm that includes a station supported over the ocean where the low tide depth in an area is adequate for lobster rearing. A plurality of lobster cages are used with means providing a position for each cage in the rearing area and a pathway therefrom to the station along which that cage may be raised and lowered and with means to deliver food to lobsters in the cages while the cages are submerged.

Another objective of the invention is to provide the station with a fishway adjacent the pathways and including a trap at the station, food escaping from the cages tolling fish into the fishway. With this arrangement, a substantial amount of lobster food can be harvested at the station and there processed, desirably by freezing it.

Another objective of the invention is the provision of cages containing lobster cells and food containers together with means to enable food to pass from the containers into the cells, the means being controlled outside the cage so that food may be released at desired intervals and in desired amounts to the cells in that cage.

Yet another objective of the invention is the provision of food containers adapted for use in such periodic and metered feeding.

A further objective of the invention is the provision of hatching cells for use in avoiding high mortality rates in rearing freshly hatched lobsters.

In the accompanying drawings, there is shown an illustrative embodiment of the invention from which these and other of its objectives, novel features, and advantages will be readily apparent.

Figure 2:
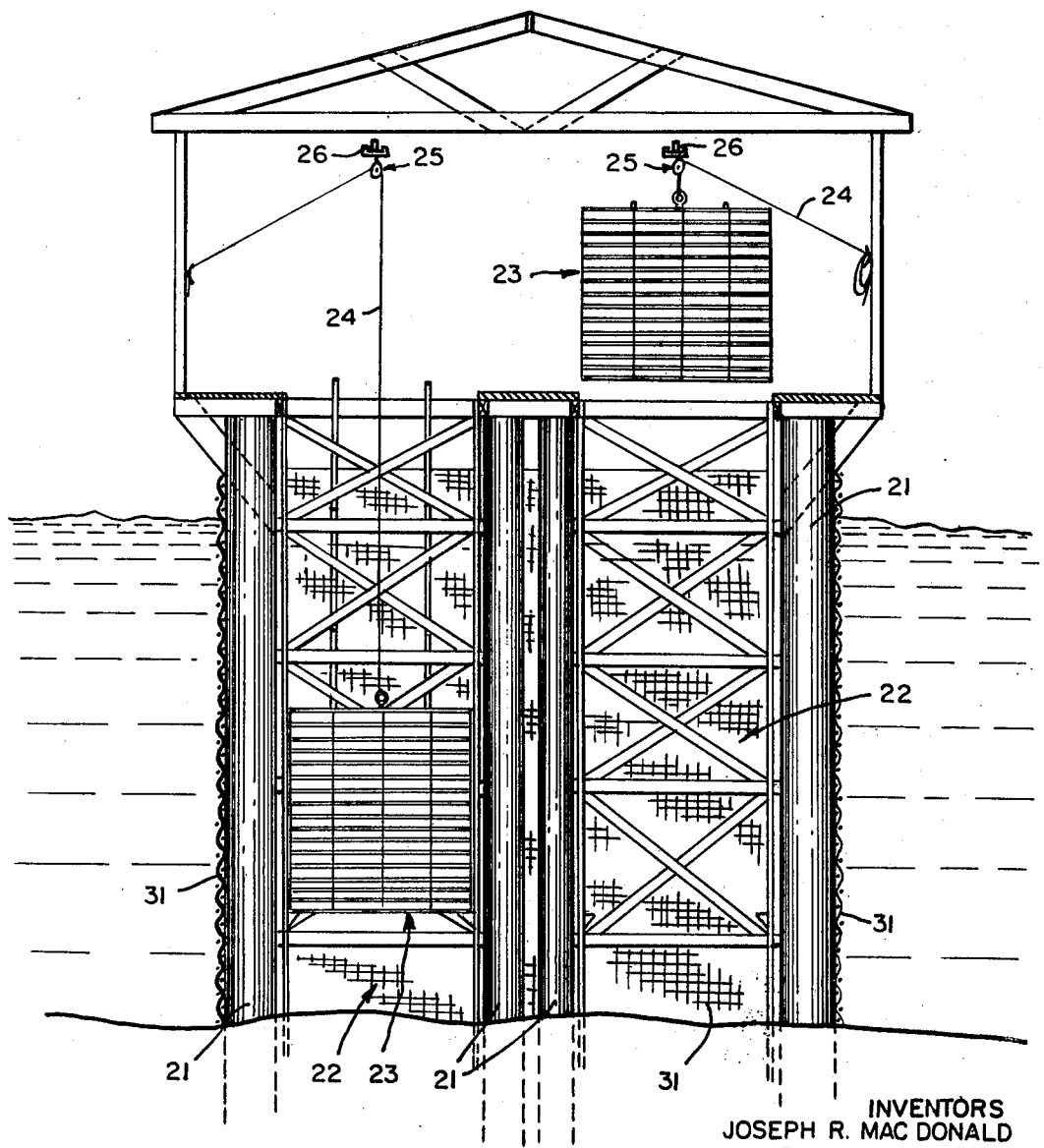
Figure 9:
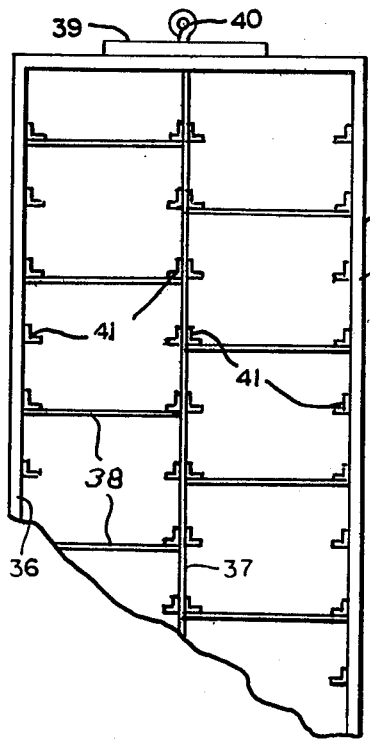
Figure 10:
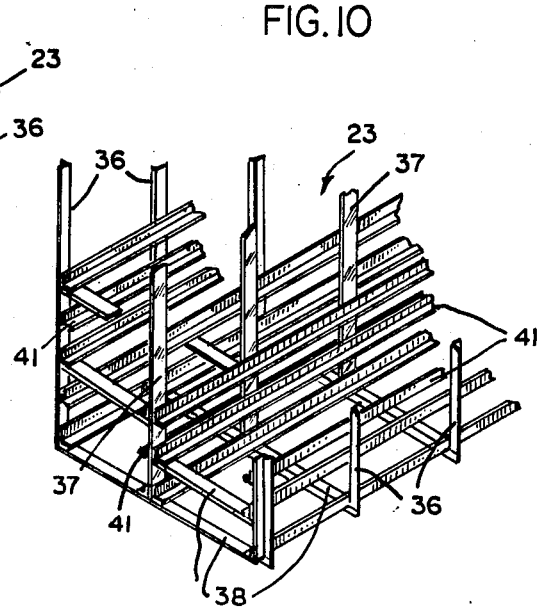
Figure 12:
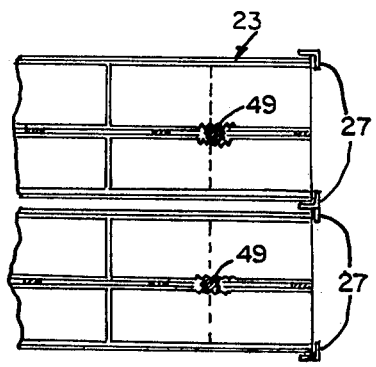
Figure 11:
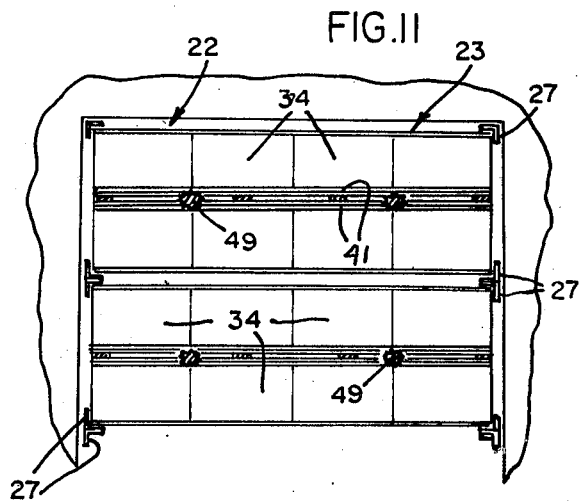
Figure 13:
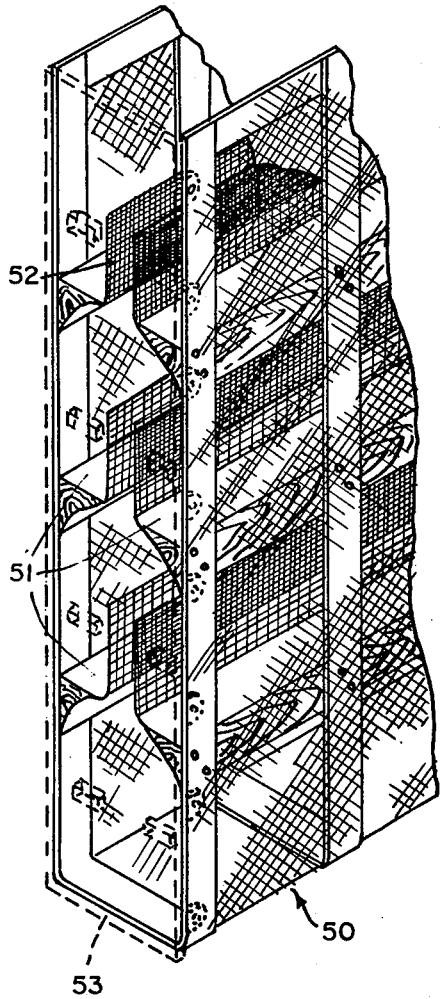
Figure 14:
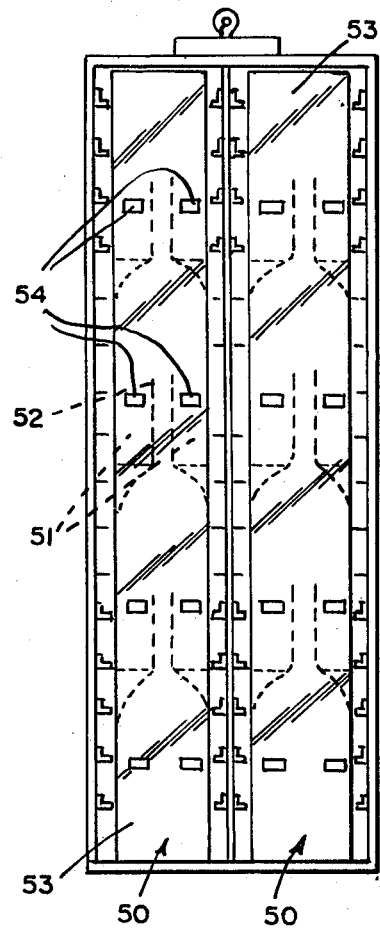

In the drawings:

FIGURE 1 is a somewhat schematic plan view of a lobster farm in accordance with the invention, FIGURE 2 is a section taken approximately along the indicated lines 2—2 of FIGURE 1, FIGURE 3 is a perspective view of a lobster receiving cell, FIGURE 4 is a fragmentary plan view of the slide of a food container, FIGURE 5 is a like view of the ported wall thereof, FIGURE 6 is a fragmentary and partly sectioned perspective view of an assembled food container, FIGURE 7 is a fragmentary vertical section of a cage with food containers and lobster cells supported therein, FIGURE 8 is a fragmentary and somewhat schematic perspective view of a series of food containers and the means by which their slides are remotely operated to control the food output therefrom, FIGURE 9 is a fragmentary end view of a cage, FIGURE 10 is a fragmentary view in perspective showing cage details, FIGURE 11 is a plan view showing two cages in use and a series of lobster-containing cells in each of them, FIGURE 12 is a fragmentary view of the two cages with food containers in place, FIGURE 13 is a fragmentary perspective view of a hatching cell, and FIGURE 14 is a view of a lobster cage with the cells shown in FIGURE 13 supported therein.

A lobster farm in accordance with the invention consists of a generally indicated station 20 shown as supported by pilings 21 over an area where the ocean depth at low tide is suitable for lobsters. The station 20 is desirably located in a sheltered place or provided with breakwater protection.

As the details of the station 20 may vary, the construction shown in FIGURES 1 and 2 is simplified to show only important features. The station 20 has, adjacent each side, a pair of spaced and parallel rows of vertical pathways, generally indicated at 22, to receive generally indicated cages 23, each adapted to be raised and lowered by suitable means, shown in FIGURE 2, simply as a rope 24 fastened thereto and extending about a pulley 25 supported on a rail 26 extending lengthwise of that row. The pathways 22 are established by securely anchored, vertical members 27 shown as of right angular section, see FIGURES 11 and 12.

The two series of pathways 22 are spaced apart and between them there is located a hatch 28, a fish grinding area 29, and a refrigerator 30 for storing lobster food. As shown in FIGURE 2, each of the two series of rows of pathways 22 are enclosed as by screening 31, that on their adjacent sides constituting part of a fish trap 32 while that elsewhere having the function of preventing theft from the cages 23. The pocket of the trap is indicated at 33 and is preferably a holder that may be lifted through the hatchway into the station, for example, a net pocket.

Each cage 23 is to contain a plurality of lobster-containing cells, generally indicated at 34, see FIGURE 3, of a suitable recticular construction and typically subdivided into a desired number of compartments 34A and a hinged cover 34B, one compartment for each lobster, together with an appropriate number of food containers, generally indicated at 35.

The cage construction is best seen in FIGURES 9 and 10 wherein a cage 23 is shown consisting of side uprights 36 and center uprights 37 interconnected by transverse members 38 with the transverse members at the top being centrally connected by a lengthwise reinforcement 39 provided with an eye 40 for the rope 24 by which the cage is raised and lowered.

The side and center uprights 36 and 37, respectively, carry vertically spaced and transversely aligned slideways that may be established by angle irons 41 anchored to the uprights and interconnected by transverse members 38. The slideways, as shown in FIGURE 7 are of sufficient height to accommodate a series of lobster-containing cells 34 and a series of food containers 35, one series on top of the other. As shown by FIGURE 11, each slideway may support a series of, say, eight cells 34 and each food container 35 is dimensioned to provide food service for four cells 34 as is illustrated in FIGURE 12.

The food container construction can best be seen in FIGURES 4–7. Each food container 35 consists of a bottom 42 and a cover 43 having a frame 44 to fit within the rim of the bottom 42 as may best be seen in FIGURE 6. The cover 43 has a plurality of food outlet ports 45, shown as triangular. The container 36 is completed by a slide 46 having a plurality of transverse slots 47 arranged so that, as the slide 46 is moved relative to the container cover 43, the slots 47 uncover the triangular ports 45 to permit the escape of food with the food outflow increasing as the slots 47 move towards a position overlying the base of the triangular ports 45.

Each slide 46 has a marginal rack portion 48 and, in use, the rack portions 48 are disposed towards the central partition defined by the uprights 37. Vertically disposed fluted shafts 49 are positioned in the central portion to protrude through gaps in the angle irons 41 that are carried by the uprights 37 and mesh with the proximate rack portions 48. The fluted shafts 49 extend into the station 20 even when the cages 23 have been lowered to the maximum extent and for that reason they may be formed in sections. In the embodiment shown in the drawings, the containers 35 on one side of a cage partition are disposed in a direction opposite to those on its other side and the slides 46 are inserted. It will also be noted from FIGURE 7 that the food containers 35 and cells 34 may be disposed with the slide 46 of a food container 34 disposed against the upper surface of a lobster cell 34 or upwardly against the bottom surface thereof as some foods float while others sink.

In use, a cage 23 is loaded with lobster cells 34 and food containers 35 and is then lowered into position in the deep area. From time-to-time, the food containers 35 are opened by turning the shafts 49 to an extent to permit the escape of desired amounts of food. In this connection, the food is desirably frozen or otherwise processed so that a supply can be provided to be dispensed without undue waste to cover a desired cycle, say twenty-four hours. Then or when another service is required, that cage is again raised into the station and the food containers replaced. It will be noted that the lobster cells and food containers may be slid into and out of a cage 23 when that cage has been so raised that its slideways are not blocked by the vertical members 27 of the pathways 22.

For raising young lobsters, the hatching cell shown in FIGURES 13 and 14 is used. In this arrangement a cell 50 has two side series of vertically spaced seed pockets 51 spaced apart to provide a central passageway 52 for freshly hatched lobsters to reach the surface and with the undersurface of the pockets 51 being contoured to eliminate places where eggs are freshly hatched lobsters may collect. The cell 50 includes removable end walls 53 to enable it to be cleaned and otherwise serviced and the end walls are also provided with doors 54, one for each pocket 51.

The trap 33 includes a guide net 55 extending outwardly therefrom and bait containers 56 on off hauls 57 are shown on each side of the guide net 55 further to lure fish towards the trap.

From the foregoing, it will be apparent that the station 20 is adapted to rear large numbers of lobsters in a relatively small place with labor costs minimized due to the ease with which they may be fed and with food costs also minimized due to luring fish for food below the station where they may be easily hauled in and processed for use in the food containers.

We claim:

1. A farm for raising lobsters and the like in a confined natural habitat comprising a station supported over the ocean where the low tide depth in an area is adequate for lobster rearing, a plurality of lobster cages, means providing a position for each cage in said area and a pathway therefrom to said station along which the cage may be raised and lowered, and means adjacent said pathway to deliver food to lobsters in said cages while the cages are under water.

2. The lobster farm of claim 1 and a fish way adjacent said pathway and including a pocket accessible from said station, food escaping from said cages drawing fish along said way.

3. The lobster farm of claim 2, a barrier member extending outwardly of the station, and a series of lure containers extending lengthwise of the barrier member, and means operable from the station to pull the lure containers into and out of the station.

4. The farm of claim 1 and means operable from the station to control said food delivery means.

5. The farm of claim 2 in which the control means are adjustable both to shut off and deliver food and to meter the delivered food.

6. The farm of claim 2 in which the pathways are arranged in two series and the fish way extends between them.

7. The farm of claim 2 and a fish processing and refrigerating station adjacent the pocket at the station end of the pathways.

8. The farm of claim 1 in which each cage includes a plurality of cells.

9. The farm of claim 1 in which each cage includes a plurality of cells, each cell having at least one reticular wall and the food delivery means includes a plurality of food containers, each food container having a wall provided with a plurality of food discharge ports, and a slide overlying the ported container wall and having a plurality of ports, and means to move the slide relative to the ported wall to close and open the ports thereof, the cells and the food containers being arranged with the reticular walls and the slides substantially in face to face contact.

10. The farm of claim 9 in which the slides include rack portions, and the slide moving means comprises a shaft extending vertically of the cage and including a pinion portion each meshing with at least one rack portion.

11. The farm of claim 9 in which the food containers and the cells are arranged one on top of the other, the food container slides include laterally exposed rack portions, and the slide moving means includes a vertically disposed shaft including rack-engaging pinion portions.

12. A cage for use in a lobster rearing and the like farm, said cage including a plurality of vertically arranged slideways, a lobster containing cell in each slideway and having a reticular wall, a food container in each slideway having a wall having food outlet ports and disposed towards the reticular wall of the cell therein, a ported member interposed between the proximate cell and container walls, and food control means extending above the cage to effect relative movement between the food container and the ported member in each slideway to open and close the food outlet ports.

13. The cage of claim 12 in which the food container and the lobster cell in each slideway are disposed one on top of the other.

14. The cage of claim 12 in which the food control means effects relative movement of the ported member relative to the container.

15. The cage of claim 12 in which the control means is of the rack and pinion type.

References Cited

UNITED STATES PATENTS

| | | | |
|---|---|---|---|
| 972,175 | 10/1910 | Evans | 119—2 |
| 1,146,911 | 7/1915 | Wilkerson | 43—102 |
| 2,302,336 | 11/1942 | MacDonald | 119—2 |
| 2,858,799 | 11/1958 | Krauss et al. | 119—5 |
| 2,989,945 | 6/1961 | Ford | 119—4 |

ALDRICH F. MEDBERY, Primary Examiner

U.S. Cl. X.R.

43—102; 119—3